United States Patent
Murata et al.

(10) Patent No.: US 7,309,547 B2
(45) Date of Patent: Dec. 18, 2007

(54) HYDROGEN ABSORBING ALLOY, ELECTRODE THEREOF AND NICKEL-METAL HYDRIDE BATTERY

(75) Inventors: Tetsuyuki Murata, Kobe (JP); Shigekazu Yasuoka, Kobe (JP); Jun Ishida, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 551 days.

(21) Appl. No.: 10/787,593

(22) Filed: Feb. 27, 2004

(65) Prior Publication Data

US 2004/0170896 A1    Sep. 2, 2004

(30) Foreign Application Priority Data

Feb. 28, 2003    (JP) .............................. 2003-052612

(51) Int. Cl.
*H01M 4/58*    (2006.01)
*H01M 4/00*    (2006.01)

(52) U.S. Cl. .................... 429/231.6; 429/223; 420/900

(58) Field of Classification Search ............. 429/218.2, 429/223, 231.6; 420/900
See application file for complete search history.

(56) References Cited

FOREIGN PATENT DOCUMENTS

| JP | 06-306515 A | 11/1994 |
|---|---|---|
| JP | 11-323469 A | 11/1999 |
| JP | 2001-316744 A | 11/2001 |
| JP | 2002-083593 | * 3/2002 |
| JP | 2002-083593 A | 3/2002 |

* cited by examiner

*Primary Examiner*—Patrick Joseph Ryan
*Assistant Examiner*—Thomas H. Parsons
(74) *Attorney, Agent, or Firm*—Kubovcik & Kubovcik

(57) ABSTRACT

A hydrogen absorbing alloy containing at least a rare-earth element, magnesium (Mg), nickel (Ni) and aluminum (Al), having an intensity ratio ($I_A/I_B$) of not smaller than 0.6 (where $I_A$ represents an intensity of the highest peak in a range of $2\theta=30°\sim34°$ in the X-ray diffraction pattern using $CuK_\alpha$-radiation as the X-ray source and $I_B$ represents the intensity of the highest peak in a range of $2\theta=40°\sim44°$), and not substantially including La as the rare-earth element.

3 Claims, 3 Drawing Sheets

HYDROGEN ABSORBING ALLOY, ELECTRODE THEREOF AND NICKEL-METAL HYDRIDE BATTERY

FIELD OF THE INVENTION

The present invention relates to a hydrogen absorbing alloy capable of absorbing and releasing hydrogen, a hydrogen absorbing alloy electrode and a nickel-metal hydride battery.

BACKGROUND OF THE INVENTION

A nickel-cadmium storage battery and nickel-metal hydride battery are well known as batteries having high capacity. The nickel-metal hydride battery is a storage battery having a negative electrode including a hydrogen absorbing alloy capable of absorbing and releasing hydrogen. It is excellent environmentally and has been widely used as a sealed miniature (small-sized) secondary battery.

In the nickel-metal hydride battery, the hydrogen absorbing alloy is used as an active material for the negative electrode. A rare-earth hydrogen absorbing alloy having a crystal structure of the $CaCu_5$ type has been used as the hydrogen absorbing alloy.

As a hydrogen absorbing alloy having a greater capacity than the rare-earth hydrogen absorbing alloy having a crystal structure of the $CaCu_5$ type, a hydrogen absorbing alloy comprising a rare-earth, Mg, and Ni as main components has been proposed. As such hydrogen absorbing alloy, a hydrogen absorbing alloy containing 10~50 atom % of La as a rare-earth element has been proposed in Japanese patent laid-open publication No. 2001-316744.

However, the hydrogen absorbing alloy disclosed in the Japanese patent publication identified above cannot provide a nickel-metal hydride battery having a sufficient life cycle.

OBJECT OF THE INVENTION

An object of the present invention is to provide a hydrogen absorbing alloy having excellent corrosion resistance, a hydrogen absorbing alloy electrode having excellent corrosion resistance and cycle life characteristics and a nickel-metal hydride battery containing the hydrogen absorbing alloy electrode.

SUMMARY OF THE INVENTION

A hydrogen absorbing alloy of the present invention is characterized as comprising at least a rare-earth element, magnesium (Mg), nickel (Ni) and aluminum (Al), having an intensity ratio ($I_A/I_B$) of not smaller than 0.6 (where $I_A$ represents an intensity of the highest peak in a range of $2\theta = 30°\sim34°$ in the X-ray diffraction pattern using $CuK_\alpha$-radiation as the X-ray source and $I_B$ represents the intensity of the highest peak in a range of $2\theta = 40°\sim44°$), and not substantially including La as the rare-earth element.

DETAILED EXPLANATION OF THE INVENTION

Figure 1:
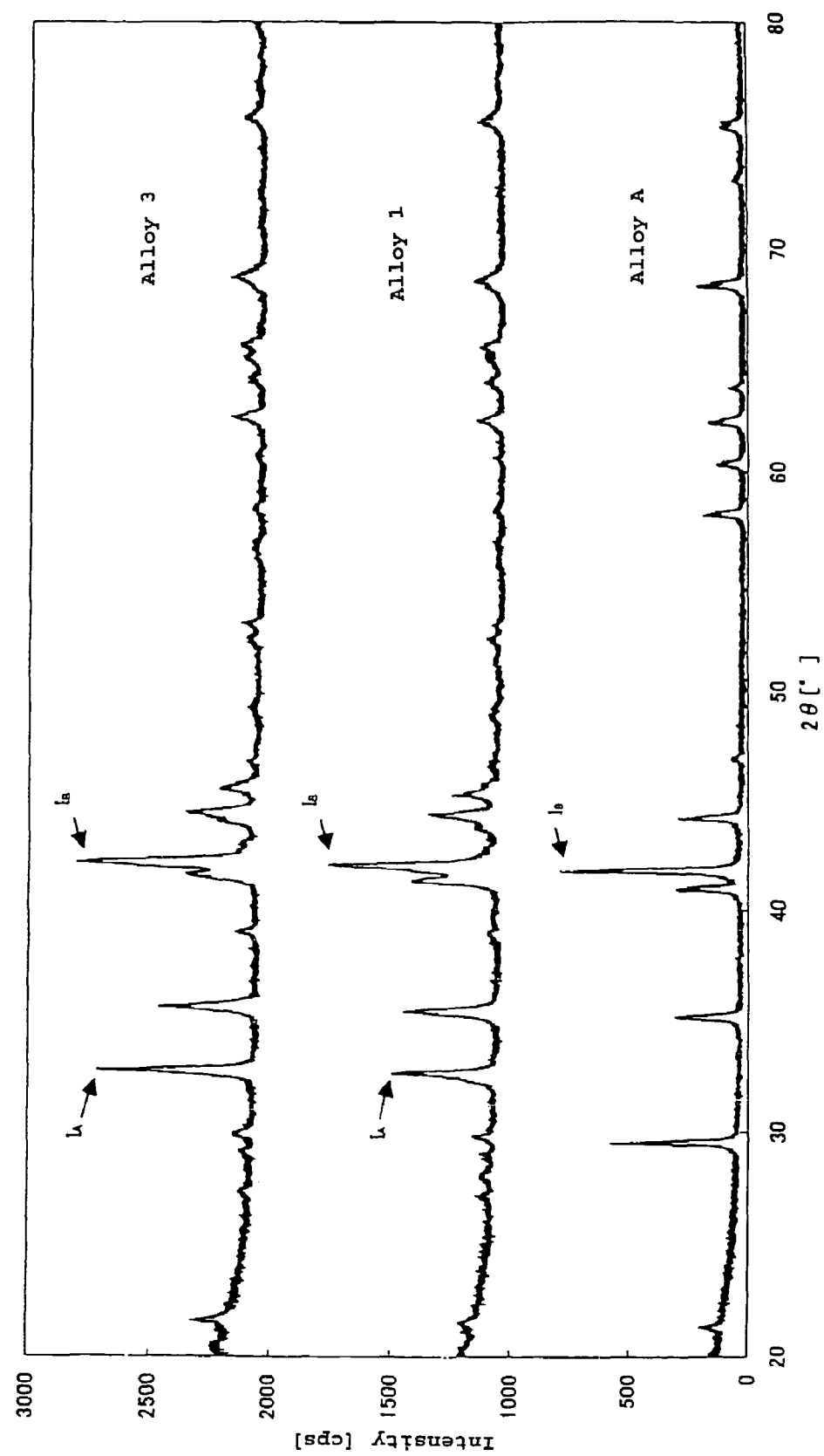
FIG. 1 is an X-ray diffraction pattern of each of alloys 1, 3 and A in the examples.

The hydrogen absorbing alloy of the present invention has excellent corrosion resistant, i.e, is resistant to oxidation. When the hydrogen absorbing alloy is used for a hydrogen absorbing alloy electrode, the electrode has excellent corrosion resistance and cycle life characteristics.

The hydrogen absorbing alloy of the present invention is characterized in that the hydrogen absorbing alloy comprises at least a rare-earth element, Mg, Ni and Al and does not substantially contain La as the rare-earth element. La not contained substantially in the hydrogen absorbing alloy means that La can be contained in the hydrogen absorbing alloy as an unavoidable impurity. As the rare-earth element other than La, Sc, Y, Ce, Pr, Nd, Pm, Sm, Eu, Gd, Tb, Dy, Ho, Er, Tm, Yb and Lu can be illustrated. Pr (praseodymium) and Nd (neodymium) are especially preferred.

The hydrogen absorbing alloy of the present invention has an intensity ratio ($I_A/I_B$) of not smaller than 0.6 (where $I_A$ represents an intensity of the highest peak in a range of $2\theta=30°\sim34°$ in the X-ray diffraction pattern using $CuK_\alpha$-radiation as the X-ray source and $I_B$ represents the intensity of the highest peak in a range of $2\theta=40°\sim44°$). $CeNi_3$ type and $Ce_2Ni_7$ type structures exhibit such intensity ratios. Thus, the hydrogen absorbing alloy of the present invention is believed to have a similar structure.

When the hydrogen absorbing alloy of the present invention is represented by the formula, $RE_{1-x}Mg_xNi_yAl_zM_a$ (wherein RE is a rare-earth element except for La and M is an element other than a rare-earth element, Mg, Ni and Al), the alloy composition preferably satisfies the relationships $0.15 \leq x \leq 0.30$, $2.8 \leq y \leq 3.9$, $0 < z \leq 0.30$ and $0 \leq y+z+a \leq 3.6$. As examples of M, Mn, Co, Fe, Zn, Sn, Cu, Si, V, Ti, Nb, Ta, Cr, Zr, Mo, Hf, W, and the like can be illustrated.

The hydrogen absorbing alloy electrode of the present invention is characterized in that the hydrogen absorbing alloy is used as an active material for an electrode of a nickel-metal hydride battery. Corrosion resistance of the electrode can be improved by using the hydrogen absorbing alloy and cycle life characteristics of the electrode also can be improved.

The nickel-metal hydride battery of the present invention is characterized in that the hydrogen absorbing alloy electrode is used as a negative electrode. Cycle life characteristics of the battery can be improved by using the electrode as the negative electrode.

There are no limitations with respect to a positive electrode for the nickel-metal hydride battery of the present invention if the positive electrode can be used for the positive electrode for a nickel-metal hydride battery. For example, a sintered or non-sintered nickel electrode can be used.

As an electrolyte, an alkaline electrolyte conventionally used as an electrolyte for a nickel-metal hydride battery can be used. A solution of KOH, NaOH and LiOH can be used alone or in various combinations thereof.

DESCRIPTION OF PREFERRED EMBODIMENT

Embodiments of the present invention are explained in detail below. It is of course understood that the present invention is not limited to these embodiments and can be modified within the spirit and scope of the appended claims.

[Preparation of Alloy]

Alloys 1~4 having the compositions described below are prepared by a high frequency induction fusing (melting)

method. Argon (Ar) having a higher pressure (gauge pressure: 1.2 kg/cm$^2$) than atmospheric pressure was used because Mg is easily volatile.

The compositions of the following alloys 1~4 are shown by atomic ratio.

Alloy 1 (Comparative Example)

La:Pr:Nd:Mg:Ni:Al=0.17:0.33:0.33:0.17:3.2:0.1

Alloy 2 (Comparative Example)

La:Pr:Nd:Mg:Ni=0.17:0.33:0.33:0.17:3.3

Alloy 3 (Example)

Pr:Nd:Mg:Ni:Al=0.415:0.415:0.17:3.2:0.1

Alloy 4 (Comparative Example)

Pr:Nd:Mg:Ni=0.415:0.415:0.17:3.3

Alloys 1 and 2 (Comparative Examples), as compared to alloy 3 (Example), contain La. Alloy 2 does not contain Al. Alloy 4 (Comparative Example), as compared to alloy 3 (Example), does not include Al.

As-cast alloys manufactured by high frequency induction fusing (melting) were treated at 950° C. in an atmosphere of Ar to prepare alloys. Then each alloy was ground in a mortar in the atmosphere to powder and was sieved to obtain fractions of 75~150 µm and 25~75 µm.

[Preparation of Electrode and Electrolyte]

Each of alloys 1~4 sieved to 25~75 µm was mixed with polyethylene oxide and polyvinylpyrrolidone (0.5% and 0.6% relative to mass of the active material, respectively) as a binder to prepare a slurry. The slurry was coated on punched metal plated nickel, and was pressed after drying to prepare a negative electrode plate.

Nickel hydroxide and hydroxypropyl cellulose (0.1% relative to mass of the active material) as a binder were mixed to prepare a slurry. The slurry was filled in a foamed metal and was pressed after drying to prepare a positive electrode plate.

An electrolyte, 6 N (normality of the solution) KOH solution, was prepared.

[Assembly of Test Battery]

The negative and positive electrode separated by a non-woven fabric separator were wound to prepare electrodes. The electrodes were placed in an outer battery can. The electrolyte was poured into the outer battery can, the can was sealed to prepare a cylindrical nickel-metal hydride battery. A theoretical capacity of the battery was 1,000 mAh.

The prepared battery was activated under the following conditions.

Charge: 100 mA×16 hours
Discharge: 200 mA, ending voltage 1.00 V

[Measurement of Cycle Life]

Charge and discharge were repeated under the conditions below, and the number of cycles to reach 60% of the discharge capacity of the first cycle was treated as a cycle life.

Charge: 1,000 mA, -ΔV cutoff (10 mV), pause 1 hour
Discharge: 1,000 mA, ending voltage 1.00 V, pause 1 hour The measured cycle life of each battery is shown in Table 1.

TABLE 1

|  | Cycle Life |
| --- | --- |
| Alloy 1 (Comparative Example) | 1321 Cycles |
| Alloy 2 (Comparative Example) | 744 Cycles |

TABLE 1-continued

|  | Cycle Life |
| --- | --- |
| Alloy 3 (Example) | 1850 Cycles |
| Alloy 4 (Comparative Example) | 635 Cycles |

It is noted that alloy 3 of the Example improves the life cycle of the battery as compared to alloy 1 of the Comparative Example. Therefore, it is understood that when La is not included in an alloy as a rare-earth element, cycle life of a battery can be improved.

When alloys 2 and 4 (both Comparative Examples) are compared, although alloy 4 does not include La, there is no improvement as compared to alloy 2. It is believed that this is because both alloys do not include Al. Therefore, the improvement effect resulting from the exclusion of La as a rare-earth element can be obtained when an alloy includes Al.

[Measurement of Oxygen Concentration in Alloy]

After being activated, alloys 1~4 were removed from each negative electrode of the batteries, were washed with water and were dried to measure oxygen concentration of each alloy by using an oxygen analysis device (Leco Co. Ltd., model: RO-416DR). The results are shown in Table 2.

TABLE 2

|  | Oxygen Concentration |
| --- | --- |
| Alloy 1 (Comparative Example) | 0.57% |
| Alloy 2 (Comparative Example) | 0.68% |
| Alloy 3 (Example) | 0.47% |
| Alloy 4 (Comparative Example) | 0.72% |

An oxygen concentration in a hydrogen absorbing alloy is an indicator of life and oxygen resistance of the hydrogen absorbing alloy. Alloy 3 of the Example has lower oxygen concentration as compared to alloy 1 of Comparative Example 1. Therefore, oxygen resistance of alloy 3 is improved when the alloy does not include La as a rare-earth element. From a comparison of the results of alloys 2 and 4, the improvement in oxygen concentration in an alloy in which La is not included can be obtained when the alloy contains Al.

[PCT Measurement]

5 g each of the powder of alloys 1 and 3 sieved to a particle diameter of 75~150 µm was placed in a stainless pressure vessel, and the pressure vessel was sealed. After discharging air under vacuum at 80° C. for two hours, 20 kgf/cm$^2$ hydrogen was introduced into the vessel at 80° C. and was gradually cooled to room temperature to activate the alloy.

Then gas was discharged to a degree of vacuum of 0.01 Torr at 40° C. to obtain a PC isotherm (pressure composition isotherm).

Figure 2:
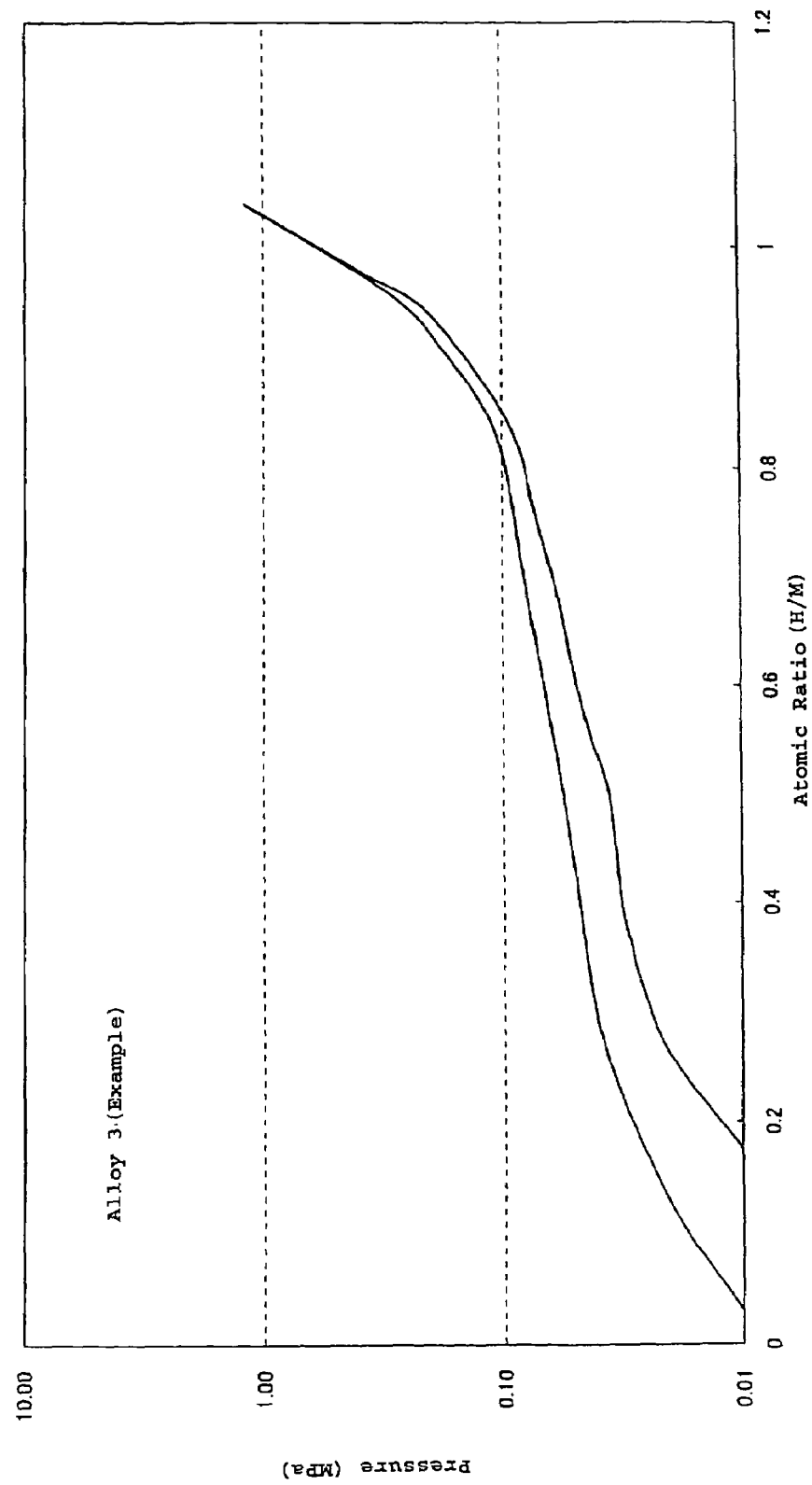
FIG. 2 is a PCT (pressure composition isotherm) characteristic curve of alloy 3 of the Example.
Figure 3:
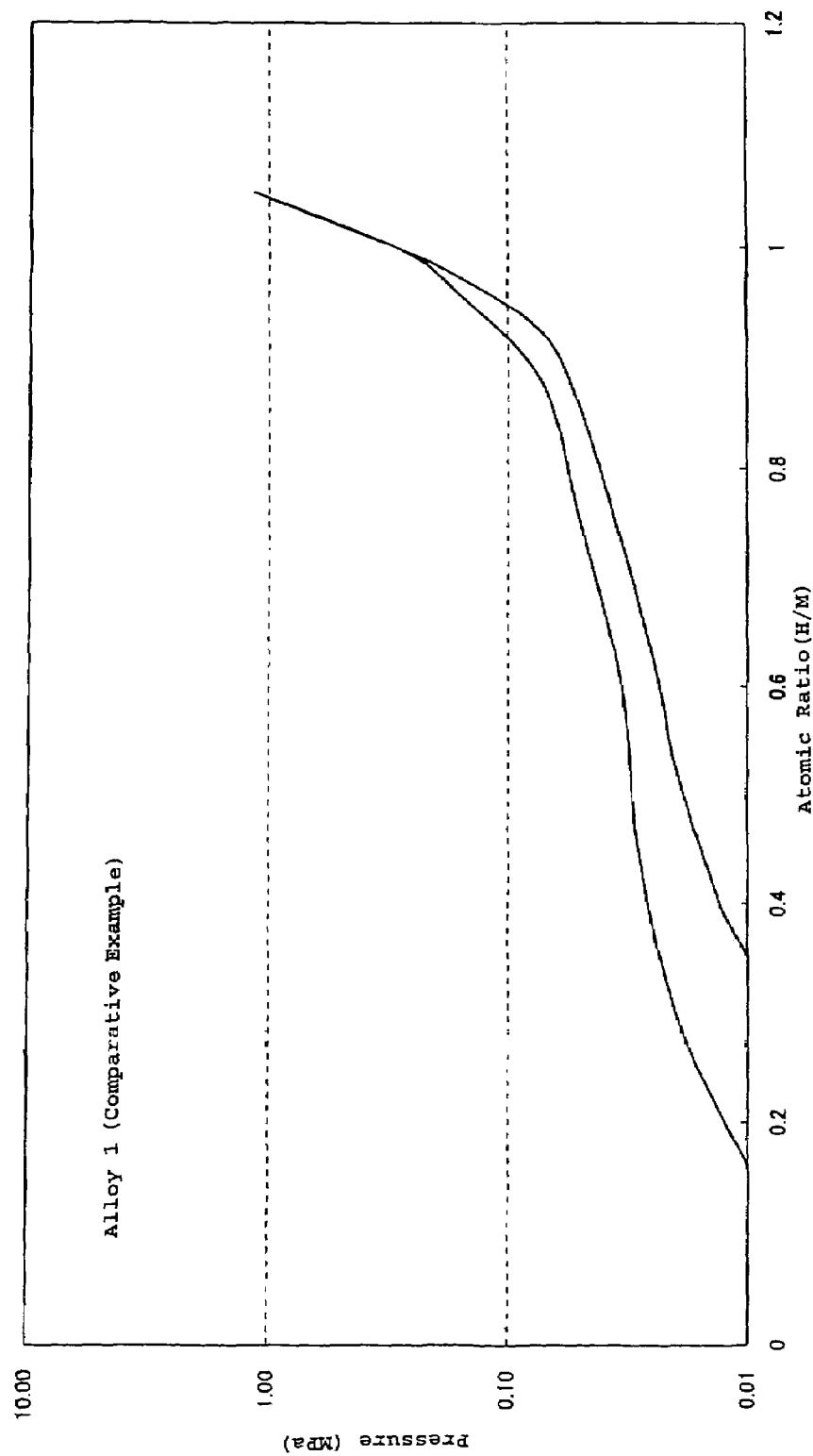
FIG. 3 is a PCT characteristic curve of alloy 1 of a Comparative Example.

PCT characteristic curves of alloys 1 and 3 at 40° C. are shown in FIGS. 2 and 3. Pressure Difference between hydrogen absorbing side and hydrogen releasing side at H/M=0.5 were calculated from the curves. The results are shown in Table 3.

TABLE 3

|  | Pressure Difference |
| --- | --- |
| Alloy 1 (Comparative Example) | 0.02 Mpa |
| Alloy 3 (Example) | 0.01 MPa |

It is noted from the results shown in Table 3 that alloy 3 of the Example has a smaller pressure difference as compared to alloy 1 of Comparative Example. That is, hysteresis of alloy 3 at hydrogen absorbing and releasing is smaller as compared to alloy 1. It is also noted that the PCT curve of alloy 3 has a higher flat level in a plateau portion as compared to that of alloy 1.

It is understood that the hydrogen absorbing alloy of the present invention is a uniform stable alloy having small hysteresis and high flat level in a plateau portion. Therefore, when the hydrogen absorbing alloy is used as an active material for a nickel-metal hydride battery, cycle life characteristics can be improved.

[Measurement of XRD]

X-ray diffraction patterns of alloys 1 and 3 were obtained by X-ray diffraction analysis using Cu-K$_\alpha$ radiation. X-ray diffraction pattern of alloy A having the composition MmNi$_{3.4}$Co$_{0.8}$Al$_{0.2}$Mn$_{0.6}$, which is an AB$_5$ type rare-earth alloy, was obtained for comparison.

X-ray diffraction patterns of alloys 1, 3 and A are shown in FIG. 1. As is clear from FIG. 1, alloys 1 and 3 have different patterns from alloy A. There are peaks in the patterns of alloys 1 and 3 in a range of 2θ=30°~34° whereas alloy A does not have a peak in the same range. Peak strength ratio ($I_A/I_B$) of alloys 1 and 3 are greater than 0.6 ($\geq$) as shown in Table 4.

TABLE 4

|  | $I_A/I_B$ |
|---|---|
| Alloy A (Comparative Example) | 0 |
| Alloy 1 (Comparative Example) | 0.65 |
| Alloy 3 (Example) | 0.89 |

From the above results, it is concluded that the hydrogen absorbing alloy of the present invention is not an AB$_5$ type.

As described above, it is believed that the hydrogen absorbing alloy of the present invention is similar in structure to CeNi$_3$ type or Ce$_2$Ni$_7$ type.

Although the alloy used in the above example is a slow cooling alloy prepared by founding, the present invention is not limited to this method. It can be a quenched alloy. As a quenching method, single roll quenching, double roll quenching, disc atomizing, gas atomizing and the like can be illustrated. There are no limitations with respect to the use of these methods.

ADVANTAGES OF THE INVENTION

According to the present invention, a hydrogen absorbing alloy having excellent corrosion resistance is provided. A nickel-metal hydride battery having excellent corrosion resistance and cycle life characteristics can be provided by using the hydrogen absorbing alloy as an electrode for the nickel-metal hydride battery.

What is claimed is:

1. A hydrogen absorbing alloy comprising at least a rare-earth element, magnesium (Mg), nickel (Ni) and aluminum (Al) and having an intensity ratio ($I_A/I_B$) of not smaller than 0.6 (where $I_A$ represents an intensity of the highest peak in a range of 2θ=30°~34° in the X-ray diffraction pattern using CuK$_\alpha$-radiation as the X-ray source and $I_B$ represents the intensity of the highest peak in a range of 2θ=40°~44°), wherein the rare-earth element is at least one element selected from the group consisting of Pr and Nd.

2. An electrode for a nickel-metal hydride battery comprising, as an active material of the electrode, the hydrogen absorbing alloy according to claim 1.

3. A nickel-metal hydride battery comprising a positive electrode, a negative electrode and an electrolyte, wherein the negative electrode is the electrode according to claim 2.

* * * * *